United States Patent [19]

Schowengerdt

[11] Patent Number: 5,307,162
[45] Date of Patent: Apr. 26, 1994

[54] CLOAKING SYSTEM USING OPTOELECTRONICALLY CONTROLLED CAMOUFLAGE

[76] Inventor: Richard N. Schowengerdt, 3145 Kerry La., Costa Mesa, Calif. 92626

[21] Appl. No.: 977,192

[22] Filed: Nov. 16, 1992

Related U.S. Application Data

[63] Continuation-in-part of Ser. No. 682,945, Apr. 10, 1991, abandoned.

[51] Int. Cl.⁵ .............................................. H04N 7/18
[52] U.S. Cl. ...................................... 348/122; 472/61; 348/586
[58] Field of Search ................ 358/93, 108, 225, 230, 358/87; 472/57, 61, 65, 71, 75, 77, 81; H04N 7/18

[56] References Cited

U.S. PATENT DOCUMENTS 2,591,068 4/1952 Hilchey ................................ 272/17
2,797,612 7/1957 Holmes ................................ 272/10
3,352,965 11/1967 Driver et al. ...................... 358/93 X
4,962,420 10/1990 Judenich .......................... 272/11 X

*Primary Examiner*—Victor R. Kostak

[57] ABSTRACT

The Cloaking System is designed to operate in the visible light spectrum, utilizes optoelectronics and/or photonic components to conceal an object within it, and employs analog or digital control feedback resulting in camouflage adaptable to a changing background. The system effectively conceals either a still or moving object from view by the interposing of a shield between an observer and the object and recreating a full color synthetic image of the background on the shield for viewing by observer, thus creating the illusion of transparency of both the object and the Cloaking System. This system consists of four major elements: a sensor; a signal processor; a shield; and a means of interconnecting, supporting, and safely enclosing the aforementioned elements along with the concealed object.

10 Claims, 3 Drawing Sheets

CLOAKING SYSTEM USING OPTOELECTRONICALLY CONTROLLED CAMOUFLAGE

This is a continuation in part of application Ser. No. 07/682,945, filed Apr. 10, 1991, now abandoned.

REFERENCES CITED

1. U.S. Pat. No. 2,591,068.
2. U.S. Pat. No. 2,797,612.
3. U.S. Pat. No. 3,352,965.
4. U.S. Pat. No. 4,962,420.

BACKGROUND OF THE INVENTION

1. Field of the Invention

The need for this invention arises out of the present state of the art of military camouflage in the visible light spectrum. This invention is designed for the purpose of concealing both stationary and moving objects from view. The term "cloaking" as used in the title of this invention and elsewhere herein refers to concealing such objects.

2. Prior Art

The techniques in use today largely involve painting, coloring, and/or contour shaping to allow an object to better blend in with the background. Such techniques are rather primitive and do little to conceal a moving object as it is not possible with present fixed state camouflage techniques to cause an object to continually blend in with a changing background. In order to effectively camouflage a moving object, its appearance must be constantly controlled from the viewpoint of the observer to blend in with the changing background from the observer's perspective. Little has been done to utilize modern advancements in optoelectornics, computers, or microminiature components to camouflage an object. The proposed system was conceived with the view in mind of effectively concealing a stationary or moving object such as a man, vehicle, or aircraft from view by utilization of this technology. This invention will find practical application in military and law enforcement where field commanders find it useful to conceal such an object from view.

SUMMARY OF THE INVENTION

This system is designed to interrupt energy in the visible light electromagnetic spectrum to effectively conceal an object from view by an observer. This is accomplished by insertion of a shield between an observer and the object being concealed and recreating a full color synthetic real-time image of the background on the shield for view by an observer, thus creating the illusion of transparency of the object. The basic concept for the application consists of four basic building blocks: a sensor, a signal processor, and a shield which are interconnected through an analog, digital, of fiber optic data bus, and a supporting structure for all system elements, the object being concealed being interposed between the background and the shield.

The signal processor formats the image of the background as viewed by the sensor and presents a synthetic image of the background on the shield for view by an observer. The object is placed behind or within the shield which is of opaque construction, and having a nonspecular display surface thus concealing the object from view by the observer and yet creating an illusion of transparency of the complete Cloaking System and the enclosed object. In its nonactivated state, the shield would have minimum light reflectivity. Although either an analog signal processor or digital signal processor may be used, the latter is described herein as one specific embodiment. The digital signal processor constantly compares the synthetic image in the shield with the reference image within the sensor and makes corrections to the synthetic image to correspond with the actual image being sensed. Data on the data bus blows in both directions. Special software or embedded firmware will also be utilized in the signal processor to make changes in the image presented on the shield to correct for distance and angle of the observer with respect to the object being concealed; the source of intelligence information pertaining to an observer is beyond the scope of this invention but is mentioned here only for clarification.

DESCRIPTION OF ONE EMBODIMENT OF THE INVENTION

Figure 1:
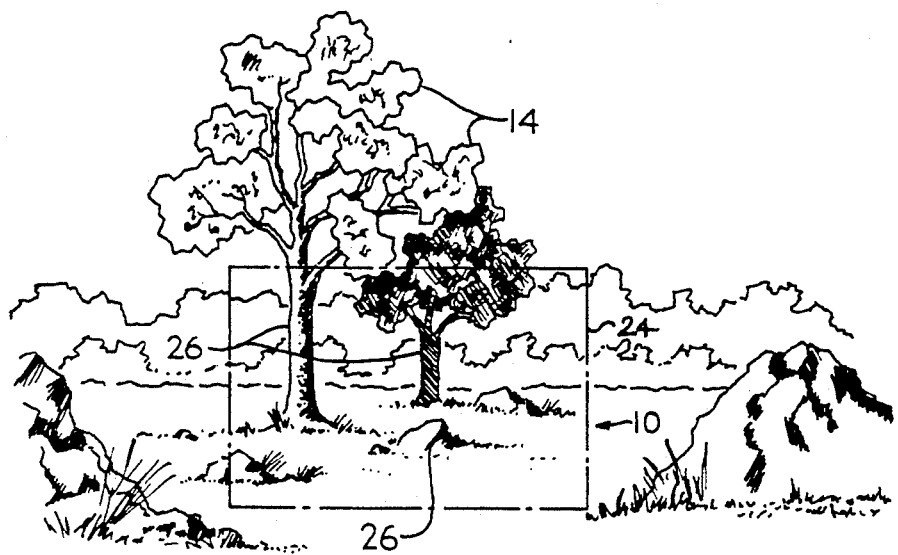
FIG. 1 is a pictorial representation of the invention and is intended to illustrate the basic concept of the invention.
Figure 2:
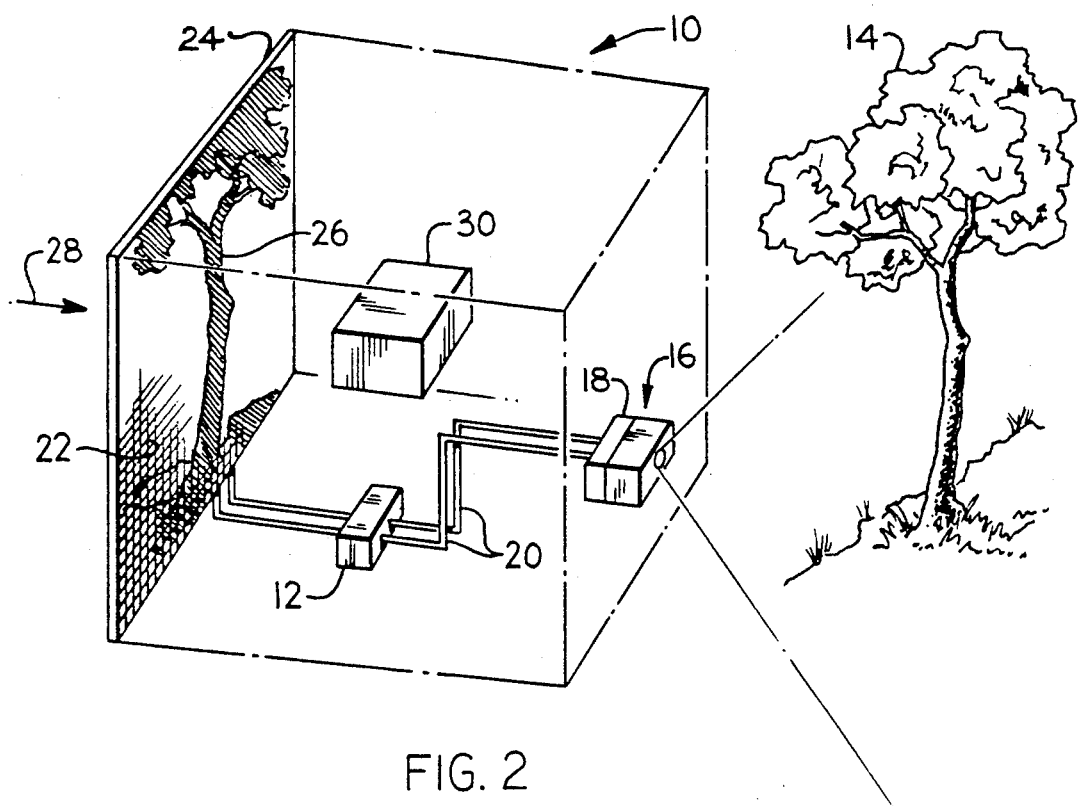
FIG. 2 is a pictorial isometric view of the system block diagram implementing the basic concept.

The basic concept of the Cloaking System 10 is illustrated in FIG. 1 wherein the background 14 is displayed on the shield 24 as a synthetic image 26 on its nonspecular display surface, when viewed from the front. FIG. 2 illustrates how the basic concept is implemented. The digital signal processor 12 is the brain and controls all operations, digitally formats the image of the background 14 as viewed by the sensor 16, establishes a reference image matrix 18 within the sensor 16, and transmits the background image signal via the data bus 20 to a synthetic image matrix 22 within the shield 24, thus causing a synthetic image 26 to be displayed on the surface of the shield 24 as seen from the direction of observation 28. The object 30 to be concealed is placed behind the shield 24 to prevent its being observed. The digital signal processor 12 constantly compares the synthetic image matrix 22 with the reference image matrix 18 and makes corrections to the synthetic image matrix 22 which in turn corrects the synthetic image 26 to correspond with the actual background image 14 being sensed, thus minimizing distortion and maintaining realism of the synthetic image 26. Data on the data bus 20 flows in both directions. The primary purpose of the system is to present on the shield 24 a near identical image of the background behind said object 30 so as to create the illusion of transparency of both said object 30 and the Cloaking System 10; a secondary purpose of the system is to alter the synthetic image 26 to create an illusion of a background that does not exist; while such a deceptive method goes beyond the scope of simply creating an illusion of transparency of the object it would be very useful for special missions or difficult scenario conditions where it would be more effective to depict an artificial background than to display a representation of the actual background. Any such alterations in the synthetic image 26 would be accomplished by software or embedded firmware and is considered part of the tactical strategy to be employed, thus emphasizing the flexibility of the invention and its potential interaction with the operating environment.

Figure 3:
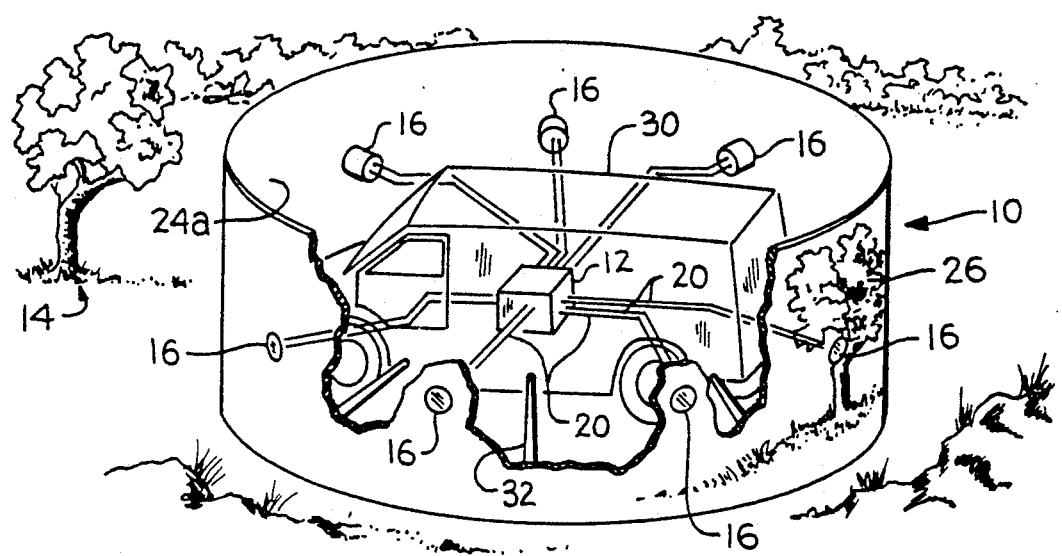
FIG. 3 is a pictorial perspective view of the invention and illustrates how an object can be concealed within a 360° shield.

The basic concept or cell unit depicted in the preceding FIG. 2 may be expanded to combine as many cells as desired to provide 360° coverage. Referring to FIG. 3, a cylindrical shield 24a is illustrated with a cutaway view showing object 30 along with the digital signal processor 12, data bus 20, and sensors 16, all supported by a suitable attachment means 32. The digital signal processor 12 organizes and presents a different synthetic image 26 on the appropriate sector of the shield 24a utilizing signals from appropriate sensors 16, together with tactical data concerning potential points of observation. The appropriate size and number of sectors would be determined by the optimal design for a given operational mission. Although shown here as separate components for clarity, the present state-of-the-art would allow incorporation of the an embedded circuitry digital signal processor 12 and sensors 16 into the shield 24a to provide a cylindrical smart skin to wrap around the object. The shield may also incorporate backplanes for mounting embedded sensors, processors and bus circuitry.

Figure 4:
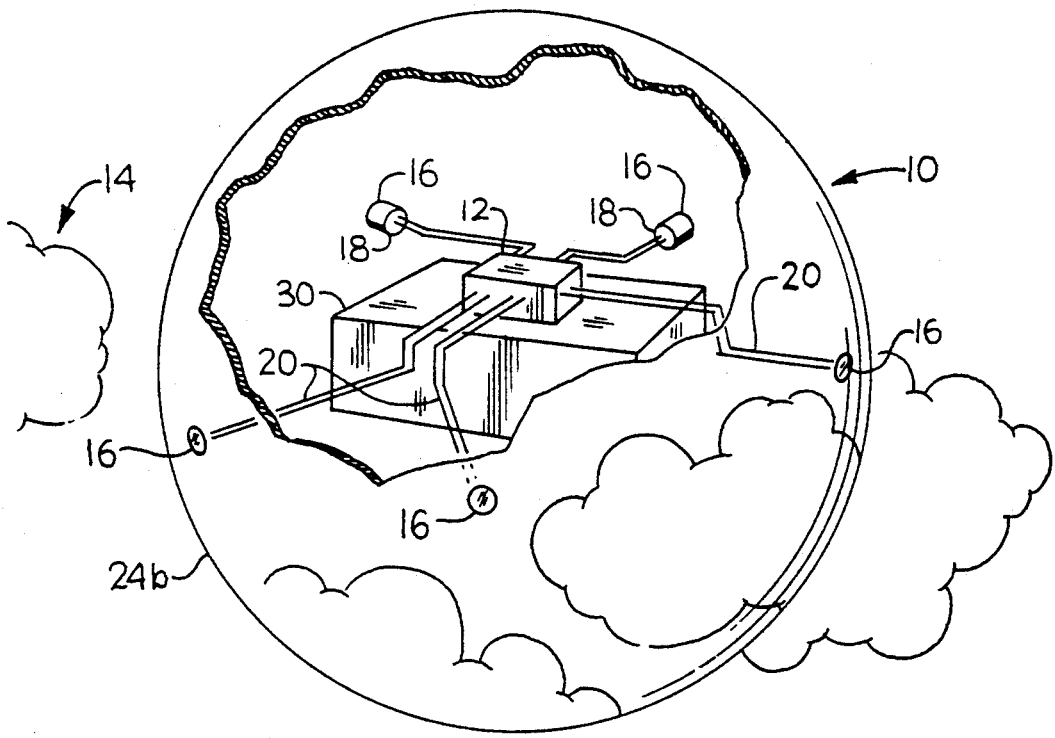
FIG. 4 is a perspective view of the invention and illustrates how an object can be concealed within a sphere.

Carrying the basic concept a step further, the shield 24b may be formed into a spherical shape as illustrated in FIG. 4. A cutaway view is again presented showing object 30, sensors 16, digital signal processor 12, data bus 20, and a spherically shaped shield 24b. As with the cylindrical shape, the digital signal processor 12 organizes and presents a different synthetic image 26 on the appropriate sector of the shield 24b utilizing both tactical data and signals from appropriate sensors 16. In this configuration there would be considerably more sectors, as compared with the cylindrical shape, and the programming would be more complex to provide a high degree of realism in the image.

Irregular shapes for the shield may also be employed utilizing conformal smart skins which would be thin digital signal processor circuits embedded within the shield display surface. However, in order to reduce distortion of the image, either a circular, cyclindrical, or spherical shape would allow uniform algorithms to be employed in the embedded processor programs in the digital signal processor 12 to correct for circular or spherical aberration. Some distortion may appear as ripples or waves in the image, depending upon the shape of the shield, relative position and motion of the observer, and complexity of background images. However, in the algorithms could be developed, such as those required for irregular or conformal shields for military vehicles, to minimize such distortion.

ALTERNATE TECHNOLOGIES AND EMBODIMENTS

Several alternate technologies and methods of implementing this invention may be utilized.

One alternate technology employs the simplest method of implementing the Cloaking System concept which would utilize a conventional analog signal processor, a specially designed liquid crystal display to present the background image on the shield, and a conventional video camera for the sensor. Since this method utilizes conventional analog technology, this method is limited to flat plane or semicircular displays and would not lend itself to image correction as could be achieved by the digital options. However, this method would allow the construction of a prototype model within a year or two to demonstrate the basic cloaking concept.

Another alternate technology employs a digital option; the main differences between this method and the first-described analog method consists of the conversion of all analog video signals to digital signals, the usage of a digital signal processor to direct all operations, and higher technology used in constructing the shield and the sensor. Because of the high flexibility of the digital method, a great variety of shapes could be used for the shield and various compensation software or embedded firmware schemes could be employed to minimize distortion in the image; hence the digital method was selected and described in the preceeding section in considerable detail as one embodiment of the invention.

In still another method, photonic materials could be used for constructing the shield and sensor which would be capable of directly manipulating light signals and transmitting these signals on a higher speed fiber optic data bus. These light signals could be then digitized and further manipulated by a digital signal processor to perform necessary system functions but without the encumbrance of the slower speed of a digital data bus. The selection of either optoelectronic or photonic building blocks for the shield, sensor, and data bus would depend upon such factors as size and shape of the object to be shielded, speed of the object relative to the background, and environment. Usage of either optoelectronic or photonic materials in extremes such as that encountered in combat would require extensive testing and development. However, for more benign applications, a state-of-the-art system could be developed within three to five years utilizing currently available materials and components.

Any one of several available commercial or military digital process and bus architectures could be used depending upon the application and program requirements. IBM-PC integrated circuits and bus standards such as RS-232 (Serial), RS-422 (Parallel), or IEEE 488 (Parallel could be used for lower cost and benign environments. In more rigorous combat environments Very High Speed Integrated Circuit (VHSIC) architecture and Military standards such as MIL-STD-1553, MIL-STD-1750, or MIL-STD-1760 could be used for complex interfaces between men and machines. Sophisticated and advanced models using fiber optic technology and a high speed data bus would have advantages in terms of small size and conformal shape adaption of the shield.

CONCEPT DEMONSTRATION MODEL

Figure 5:
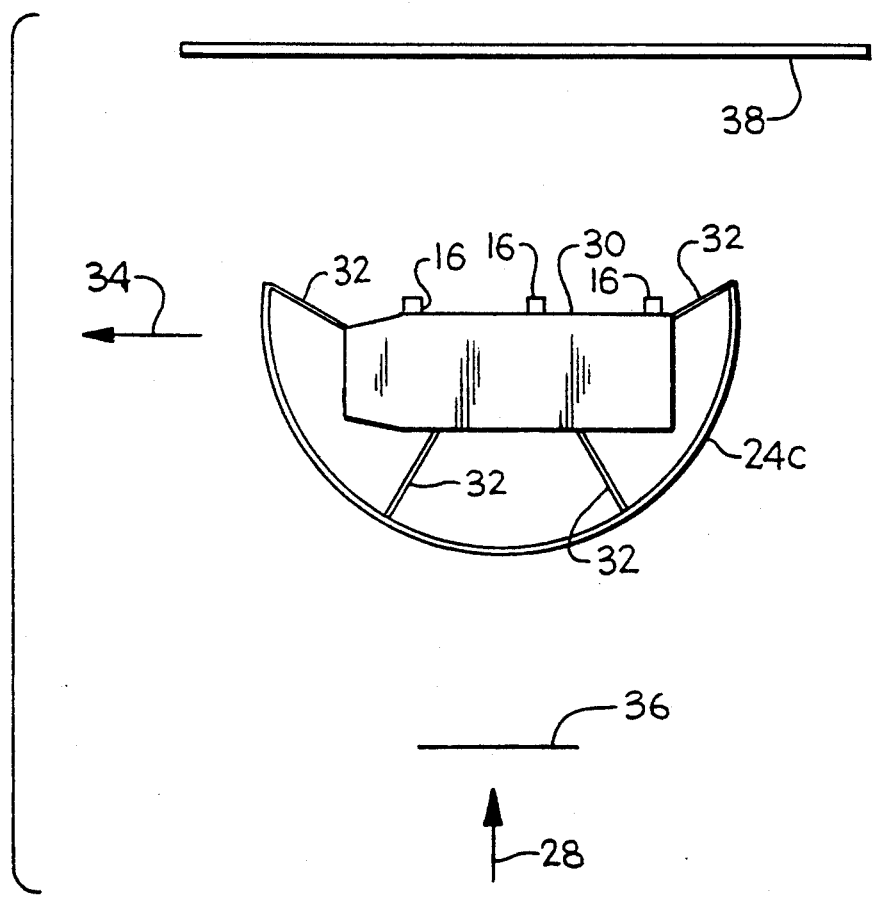
FIG. 5 is an orthographic view that illustrates a simple concept demonstration model.

A simple Concept Demonstration Model could be constructed utilizing any of the above-described technologies and methods. This model is shown in FIG. 5; the object 30, such as a vehicle, is shown in a top view with a semicircular shield 24c secured by an attachment means 32, such as supporting struts. Sensors 16 view the wall 38 and the analog signals are subsequently displayed on the shield 24c facing the point of observation 28 behind line 36 which is fifty feet from the vehicle 30. The vehicle 30 is moving to the left as shown by the arrow 34. When the system is operating properly, the vehicle 30 would never be observed; only the wall 38 behind said vehicle 30 would be seen. For simplicity and to establish a reference, the wall 38 would probably be initially monochromatic and color patterns added later to present more difficult scenarios and to measure system limitations.

LIST OF REFERENCES CITED

1. U.S. Pat. No. 2,591,068, Hilchey, Eugene L., *Studio Background*, Apr. 1, 1952.
2. U.S. Pat. No. 2,797,612, Holmes, Oscar J., *Intermittent Motion Picture Film Feed Apparatus*, Jul. 2, 1957.
3. U.S. Pat. No. 3,352,965, Driver, Paul C., and Fowler, Robert E., *Method And Means For Enhancing Camouflaged Target Detection Utilizing Light Polarization Techniques*, Nov. 14, 1967.
4. U.S. Pat. No. 4,962,420, Judenich, Gennady I., *Entertainment Video Information System Having A Multiplane Screen*, Oct. 9, 1990.

I claim:

1. A system for concealing an object from view by an observer through use of a background scene and comprising:
    means for sensing a background scene and for generating a video image signal therefrom;
    means for creating a processed image of said background video image signal for display purposes; and
    means for displaying an image represented by said processed image signal, the generated image being part of the sensed field of view, the object located between the means for sensing and the means for displaying, the object thereby being substantially camouflaged by the image displayed.

2. A concealing system according to claim 1 wherein said background scene sensing means comprises means for converting background light images electrical analog image signals for processing by an analog signal processor.

3. A concealing system according to claim 1 wherein said background scene sensing means for converting background light images to electrical digital image signals for processing by a digital signal processor comprises;
    means for responding to digital commands from a digital signal processor;
    means for storing digital image signals in a reference background image matrix array within the sensor upon command by the digital signal processor; and
    means for providing digital information from said array upon said command from said digital signal processor.

4. A concealing system according to claim 1 wherein said sensing means for sensing a background scene produces fiberoptic image signals for said processed image.

5. A concealing system according to claim 1 wherein a processing subsystem, including said background sensing means, has the means for processing digital image signals for the purpose of presentation to a shield subsystem comprising:
    means for formatting digital image signals from said sensing means;
    means for receiving and commanding said sensing means to store digital image signals in a reference background image matrix therein;
    means to receive and transmit digital image signals from the reference background image matrix to a synthetic image matrix within a shield subsystem;
    means to compare the digital information stored in the reference background image matrix in the sensor with that stored in the synthetic image matrix;
    means coupled to said means to compare digital information for correcting or altering the image displayed on the shield subsystem by providing commands to the shield subsystem;
    means for converting analog video signals from said correcting means to digital image signals;
    means for converting created optical image signals to digital image signals;
    means for formatting digital image signals from said optical image creating means into a form suitable for presentation to the shield subsystem; and means for receiving and commanding the display at information stored in the synthetic image matrix.

6. A shield for concealing an object from view of an observer comprising:
    means for providing a light absorbing opaque and nonspecular display surface which, in its nonactivated state, has minimum light reflectivity;
    means for receiving and commanding the display of information from an analog signal processor;
    means for providing in said display's activated state the display of a near-identical full color image of the background or other scene for view on the shield surface facing an observer as directed by said analog signal processor, said shield including means to obstruct visual sight of an adjacent concealed object;
    means associated with said object for support thereof; and
    means to support said analog processor, at least one sensor, and circuitry therefor.

7. A shield for concealing an object from view comprising:
    means for providing a light absorbing opaque and nonspecular display surface that, in its nonactivated state, has minimum light reflectivity;
    means for obstructing visual sight of an object in said shield, concealed adjacent thereto from view;
    means for receiving and commanding the display of information from a digital signal processor;
    means for providing in its activated state the display of a near-identical full-color image of a screen for view on the shield surface being viewed as directed by said digital signal processor;
    means for storing digital image signals in an array within a synthetic image matrix;
    means for display of said digital image signals in the form a full-color image of the background as stored in said synthetic image matrix, said full-color image to be presented on said surface being viewed;
    means associated with said object for support thereof; and
    means to support said digital signal processor and at least one sensor in association with said shield including backplanes for mounting embedded components, embedded sensors, and embedded data busses.

8. A shield according to claim 7 wherein said shield is constructed from fiberoptic materials and has means for responding to commands from said digital signal processor.

9. A shield according to claim 7 including an integral support structure for said shield, said signal processor, and an object to be concealed, said shield including backplanes for mounting embedded components, embedded sensors, and embedded data buses.

10. A shield according to claim 8 including an integral support structure for said sensor, said signal processor, and an object to be concealed, said shield including backplanes for mounting embedded components, embedded sensors, and embedded data buses.

* * * * *